(12) United States Patent
Ito

(10) Patent No.: US 11,932,109 B2
(45) Date of Patent: Mar. 19, 2024

(54) VEHICLE-MOUNTED DISPLAY SYSTEM

(71) Applicant: TOYOTA JIDOSHA KABUSHIKI KAISHA, Toyota (JP)

(72) Inventor: Hironori Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 17/322,029

(22) Filed: May 17, 2021

(65) Prior Publication Data

US 2021/0362599 A1    Nov. 25, 2021

(30) Foreign Application Priority Data

May 19, 2020    (JP) .................. 2020-087410

(51) Int. Cl.
| | | |
|---|---|---|
| *G06T 11/20* | (2006.01) | |
| *B60K 35/00* | (2006.01) | |
| *G01S 17/42* | (2006.01) | |
| *G01S 17/931* | (2020.01) | |
| *G06F 3/14* | (2006.01) | |

(Continued)

(52) U.S. Cl.
CPC .............. *B60K 35/00* (2013.01); *G01S 17/42* (2013.01); *G01S 17/931* (2020.01); *G06F 3/14* (2013.01); *G06T 7/70* (2017.01); *G06T 11/00* (2013.01); *G06T 11/203* (2013.01); *B60K 35/28* (2024.01); *B60K 35/81* (2024.01); *B60K 2360/166* (2024.01); *B60K 2360/167* (2024.01); *B60K 2360/178* (2024.01); *B60K 2360/21* (2024.01);

(Continued)

(58) Field of Classification Search
CPC .......... G01S 17/42; G01S 17/931; G06F 3/14; G06T 7/70; G06T 11/00; G06T 11/203; G06T 2207/30256; B60K 2370/52
See application file for complete search history.

(56) References Cited

U.S. PATENT DOCUMENTS 8,473,144 B1    6/2013 Dolgov et al.
2018/0067487 A1*    3/2018 Xu ...................... G01S 17/931
(Continued)

FOREIGN PATENT DOCUMENTS

| JP | 2000-121730 A | 4/2000 |
|---|---|---|
| JP | 2000-131433 A | 5/2000 |

(Continued)

*Primary Examiner* — Grace Q Li
(74) *Attorney, Agent, or Firm* — Sughrue Mion, PLLC

(57) ABSTRACT

A display system includes: a LiDAR measuring a position of a first surrounding vehicle; a position measuring device measuring a position of a second surrounding vehicle not measured in position by the LiDAR; a display device displaying dividing line icons corresponding to dividing lines around the ego vehicle and surrounding vehicle icons corresponding to the surrounding vehicles around the ego vehicle, and a controller controlling display of the dividing line icons and the surrounding vehicle icons at the display device. The controller is configured to specify a display position in a front-back direction corresponding to a position in the front-back direction of the second surrounding vehicle measured by the position measuring device and a display position in a left-right direction corresponding to a position in the left-right direction in a lane in which the second surrounding vehicle is running, as a display position of a surrounding vehicle icon.

7 Claims, 9 Drawing Sheets

(51) Int. Cl.
*G06T 7/70* (2017.01)
*G06T 11/00* (2006.01)

(52) U.S. Cl.
CPC ............... *B60K 2360/48* (2024.01); *G06T 2207/30256* (2013.01)

(56) References Cited

U.S. PATENT DOCUMENTS

| | | |
|---|---|---|
| 2018/0157038 A1 | 6/2018 | Kabe |
| 2021/0001883 A1 | 1/2021 | Kasuga et al. |
| 2021/0197824 A1* | 7/2021 | Kim ....................... B60K 35/00 |
| 2021/0269052 A1* | 9/2021 | Seo ..................... B60W 30/165 |
| 2022/0324444 A1* | 10/2022 | Germain ............... B60W 50/14 |

FOREIGN PATENT DOCUMENTS

| | | | |
|---|---|---|---|
| JP | 2009-090840 A | | 4/2009 |
| JP | 2009222392 A | * | 10/2009 |
| JP | 2014-089691 A | | 5/2014 |
| JP | 2017-037634 A | | 2/2017 |
| JP | 2017-227506 A | | 12/2017 |
| JP | 2018-092291 A | | 6/2018 |
| WO | 2019/207639 A1 | | 10/2019 |

\* cited by examiner

VEHICLE-MOUNTED DISPLAY SYSTEM

FIELD

The present disclosure relates to a vehicle-mounted display system.

BACKGROUND

In the past, in detecting positions of surrounding vehicles around an ego vehicle, use of a milliwave radar or other radar has been proposed (for example, JP 2018-92291 A, JP 2000-131433 A, JP 2017-227506 A, JP 2009-90840 A, JP 2014-89691 A). Further, a vehicle-mounted display system displaying, on a vehicle display device, vehicle icons corresponding to an ego vehicle and a surrounding vehicle around the ego vehicle, and a dividing line icon corresponding to a lane in front of the ego vehicle, based on such a detected position of the surrounding vehicle, has been proposed (for example, JP 2018-92291 A).

SUMMARY

In this regard, if detecting the position of a surrounding vehicle around an ego vehicle from detection data of a milliwave radar or some other radar or an image of an external vehicle camera capturing a region ahead of the ego vehicle, sometimes the position of the surrounding vehicle cannot necessarily be accurately detected. If the position of the surrounding vehicle cannot be accurately detected in this way, it is not possible to display, on the vehicle display device, a surrounding vehicle icon indicating the surrounding vehicle at a suitable position.

In consideration of the above technical problem, an object of the present disclosure is to provide a vehicle-mounted display system able to display a surrounding vehicle icon corresponding to a surrounding vehicle at a suitable position.

The present disclosure has the following gist.

(1) A vehicle-mounted display system displaying an ego vehicle and surrounding vehicles around the ego vehicle, the vehicle-mounted display system comprising:
- a LiDAR measuring a position of a first surrounding vehicle around the ego vehicle;
- a surrounding vehicle position measuring device measuring a position of a second surrounding vehicle around the ego vehicle not measured in position by the LiDAR;
- a display device displaying dividing line icons corresponding to dividing lines around the ego vehicle and surrounding vehicle icons corresponding to the surrounding vehicles around the ego vehicle, and
- a display control device controlling display of the dividing line icons and the surrounding vehicle icons at the display device, wherein
- the display control device has a vehicle position specifying part specifying a display position in a front-back direction corresponding to a position in the front-back direction of the second surrounding vehicle measured by the surrounding vehicle position measuring device and a display position in a left-right direction corresponding to a position in the left-right direction in a lane in which the second surrounding vehicle is running, as a display position of a surrounding vehicle icon corresponding to the second surrounding vehicle.

(2) The vehicle-mounted display system according to above (1), wherein the vehicle position specifying part specifies display positions in the front-back direction and left-right direction of the first surrounding vehicle measured in position by the LiDAR, as a display position of the surrounding vehicle icon corresponding to the first surrounding vehicle.

(3) The vehicle-mounted display system according to above (1) or (2), wherein the vehicle position specifying part estimates a center position in the left-right direction of a lane in which the second surrounding vehicle is running, based on a position in the front-back direction of the second surrounding vehicle and, if a distance between the estimated center position in the left-right direction of the lane and a center position in the left-right direction of the second surrounding vehicle measured by the surrounding vehicle position measuring device is equal to or less than a predetermined distance, makes the surrounding vehicle icon corresponding to the second surrounding vehicle be displayed at a display position in the front-back direction and left-right direction corresponding to the positions in the front-back direction and left-right direction of the second surrounding vehicle measured by the surrounding vehicle position measuring device.

(4) The vehicle-mounted display system according to any one of above (1) to (3), wherein
- the display control device further has a dividing line position specifying part specifying positions of dividing lines of a road on which the ego vehicle is running based on map information of the road on which the ego vehicle is running, and specifying the specified positions of the dividing lines as display positions of dividing line icons corresponding to the dividing lines, and
- the vehicle position specifying part estimates a position in the left-right direction in the lane closest to the position of the second surrounding vehicle in the left-right direction, based on the specified positions of the dividing lines and the position in the front-back direction of the second surrounding vehicle.

(5) The vehicle-mounted display system according to any one of above (1) to (3),
- further comprising an external vehicle camera capturing a road around the ego vehicle, wherein
- the display control device further has a dividing line position specifying part specifying positions of dividing lines of the road on which the ego vehicle is running based on an image captured by the external vehicle camera, and specifying the specified positions of the dividing lines as display positions of dividing line icons corresponding to the dividing lines, and
- the vehicle position specifying part estimates the position in the left-right direction in the lane closest to the position of the second surrounding vehicle in the left-right direction, based on the specified positions of the dividing lines and the position in the front-back direction of the second surrounding vehicle.

(6) The vehicle-mounted display system according to above (3),
- further comprising an external vehicle camera capturing the road in front of the ego vehicle, wherein
- the vehicle position specifying part calculates an angle of an advancing direction of the second surrounding vehicle of the ego vehicle with respect to an advancing direction based on an image of the second surrounding vehicle captured by the external vehicle camera, specifies the position in the left-right direction of the second surrounding vehicle based on the calculated angle and the position in the front-back direction of the second surrounding vehicle measured by the surrounding vehicle position measuring device, and, if a distance between the specified position in the left-right direction of the second surrounding vehicle and the position in the left-right direction of the second surrounding vehicle measured by the surrounding vehicle position measuring device, is equal to or less than a predetermined distance, makes the surrounding vehicle icon corresponding to the second surrounding vehicle be displayed at a display position in the front-back direction and left-right direction corresponding the position in the front-back direction and left-right direction of the second surrounding vehicle measured by the surrounding vehicle position measuring device.

(7) The vehicle-mounted display system according to above (6), wherein if the ego vehicle is changing lanes, the vehicle position specifying part makes a surrounding vehicle icon corresponding to the second surrounding vehicle be displayed at a display position in the front-back direction and left-right direction corresponding the positions in the front-back direction and left-right direction of the second surrounding vehicle measured by the surrounding vehicle position measuring device.

(8) A vehicle-mounted display system displaying an ego vehicle and surrounding vehicles around the ego vehicle, the vehicle-mounted display system comprising:

a surrounding vehicle position measuring device detecting positions of second surrounding vehicles around the ego vehicle, a display device displaying dividing line icons corresponding to dividing lines around the ego vehicle and surrounding vehicle icons corresponding to the surrounding vehicles around the ego vehicle, and a display control device controlling display of the dividing line icons and the surrounding vehicle icons at the display device, wherein when positions of a preceding vehicle running in the same lane ahead of the ego vehicle and a further preceding vehicle running in the same lane ahead of that preceding vehicle are specified by the surrounding vehicle position measuring device, the display control device makes the surrounding vehicle icon corresponding to the preceding vehicle be displayed at a display position in the front-back direction and left-right direction corresponding to the position in the front-back direction and left-right direction of the preceding vehicle specified by the surrounding vehicle position measuring device, and makes the surrounding vehicle icon corresponding to the further preceding vehicle be displayed at a display position in the front-back direction corresponding to the position in the front-back direction of the further preceding vehicle specified by the surrounding vehicle position measuring device and at a display position in the left-right direction corresponding to the position in the left-right direction in the lane in which the further preceding vehicle is running.

DESCRIPTION OF EMBODIMENTS

Figure 1:
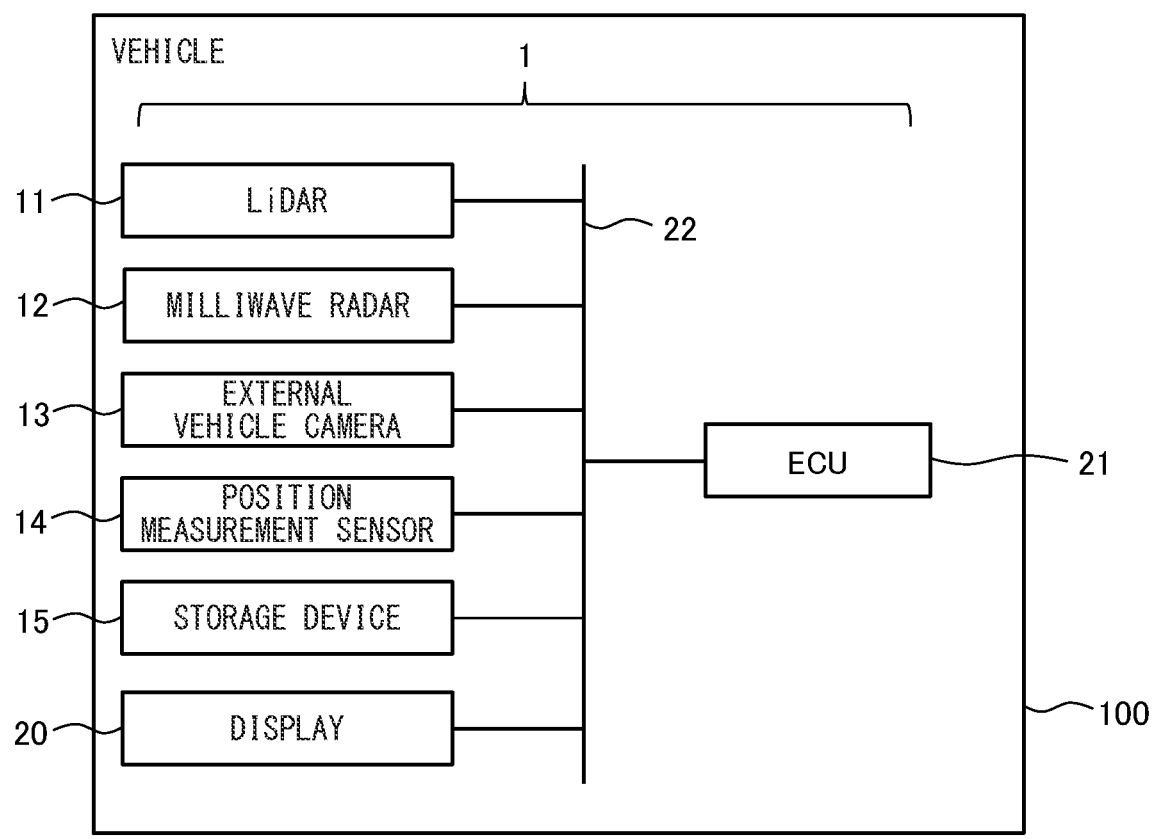
FIG. 1 is a view of the configuration schematically showing a vehicle-mounted display system according to one embodiment

Below, referring to the drawings, embodiments will be explained in detail. Note that, in the following explanation, similar component elements are assigned the same reference notations.

Figure 2:
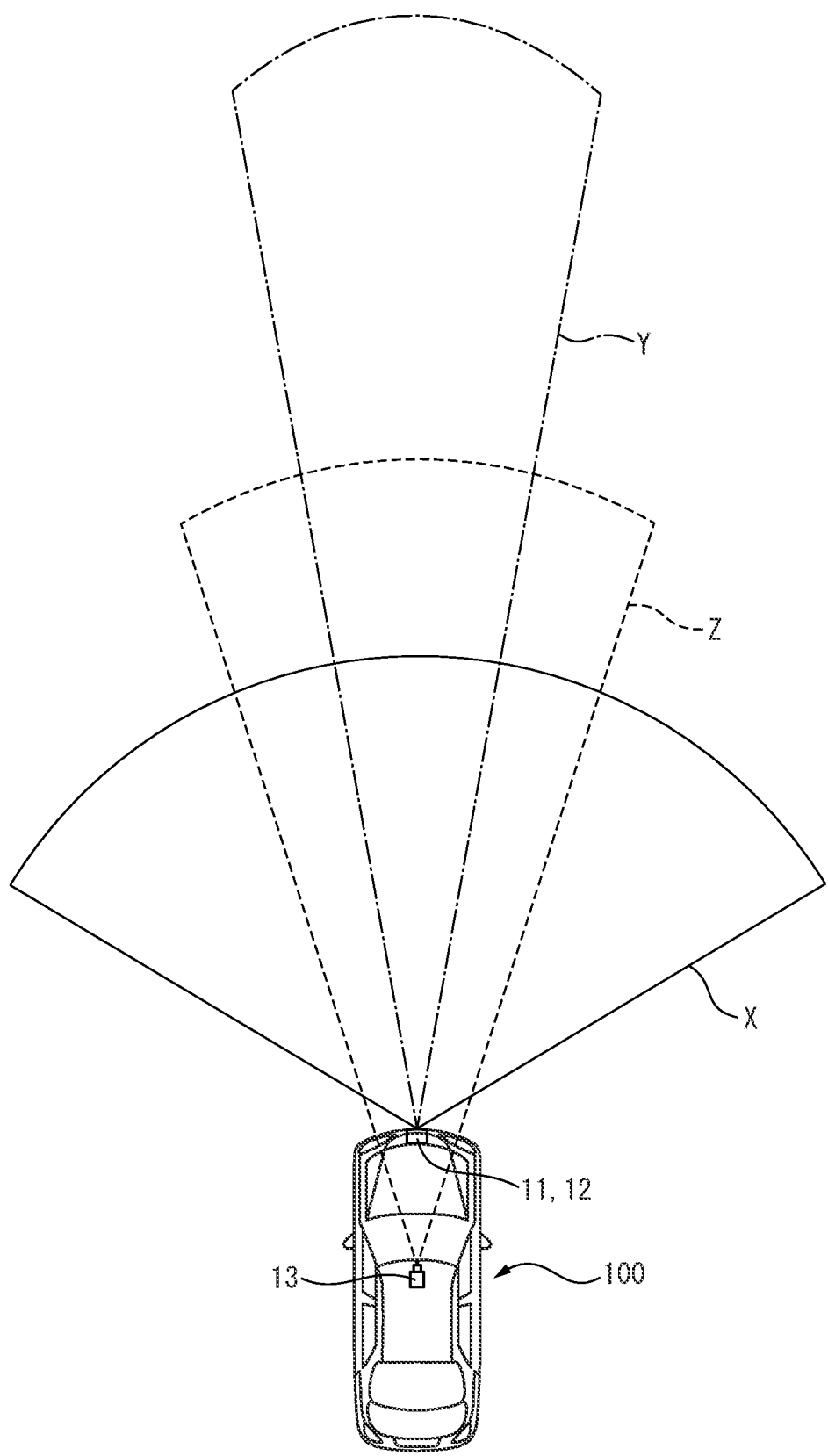
FIG. 2 is a plan view of a vehicle mounting the vehicle-mounted display system.

Referring to FIGS. 1 and 2, a vehicle-mounted display system 1 displaying an ego vehicle and a surrounding vehicle around the ego vehicle will be explained. FIG. 1 is a view of the configuration schematically showing the vehicle-mounted display system 1 according to one embodiment. FIG. 2 is a plan view of a vehicle 100 mounting the vehicle-mounted display system 1.

The vehicle-mounted display system 1 is mounted in the vehicle 100 and displays various information at a display device. In the present embodiment, the vehicle-mounted display system 1 has a LiDAR 11, milliwave radar 12, external vehicle camera 13, position measurement sensor 14, storage device 15, display device 20, and electronic control unit (below, referred to as an "ECU") 21.

However, the vehicle-mounted display system 1 need not necessarily have all of these components. For example, the vehicle-mounted display system 1 need not necessarily have the external vehicle camera 13, if having the milliwave radar 12.

The LiDAR 11, milliwave radar 12, external vehicle camera 13, position measurement sensor 14, storage device 15, display device 20, and ECU 21 are connected through an internal vehicle network 22 to be able to communicate with each other. The internal vehicle network 22 is a network based on the CAN (Controller Area Network) or other specification.

The LiDAR 11 is a position measuring sensor measuring reflected light of laser light emitted in a pulse manner so as to measure the position of an object in its range of measurement. The objects specifically includes the road and obstructions in the range of measurement (for example, buildings, vehicles on the road, curbs, fallen objects, pedestrians, etc.). The LiDAR 11, as shown in FIG. 2, is arranged at a front end part of the vehicle 100 (for example, inside a front bumper). However, the LiDAR 11 may be arranged at a different position from the front end part of the vehicle 100. Further, a plurality of the LiDARs 11 may be provided in the vehicle 100. The range of distance, by which the LiDAR 11 can measure, is the range X shown by the solid line in FIG. 2 (for example, about 100 m). Therefore, in the present embodiment, if compared with the later explained milliwave radar 12 or external vehicle camera 13, the measurable range is short.

Figure 3:
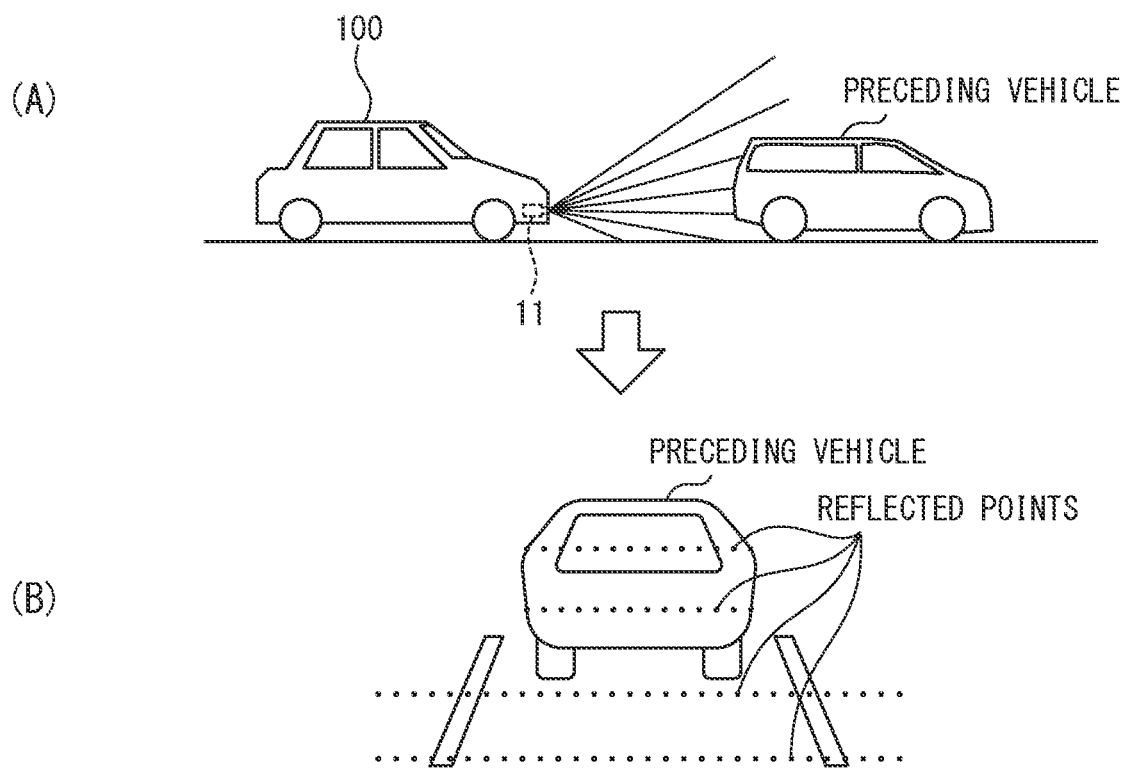
FIG. 3 is a view showing a measurement technique of distance to an object by LiDAR

FIG. 3 is a view showing a measurement technique of distance to an object by the LiDAR 11. The LiDAR 11, as shown in (A) of FIG. 3, emits a row of laser light aligned in the vertical direction with different angles of emission in the up-down direction while scanning in the lateral direction (horizontal direction), and receives reflected light of the emitted laser light. Further, the LiDAR 11 measures the distance to an object in the direction of emission based on the time period from when emitting the laser light to when receiving the reflected light. Specifically, the LiDAR 11, as shown in (B) of FIG. 3, measures the distance to an object for every point illuminated by the laser light (reflected point), and generates point cloud data of the distance to the object in the range of measurement. Each time point cloud data is generated, the LiDAR 11 outputs the generated point cloud data through the internal vehicle network 22 to the ECU 21. Note that, the LiDAR 11 may also measure the distance to an object by another system so long as possible to measure the position of the object utilizing laser light.

The milliwave radar 12 is a distance measuring sensor which continuously emits radio waves with a wavelength in mm units in a pulse manner or continuously with modulating the frequency and measures the reflected waves of the radio waves to measure the position of an object in the range of measurement. Specific objects include, for example, obstacles in the range of measurement. Therefore, the milliwave radar 12 functions as a surrounding vehicle position measuring device detecting the position of a surrounding vehicle around the vehicle 100. The milliwave radar 12, as shown in FIG. 2, is arranged at a front end part of the vehicle 100 (for example, in the front bumper). In particular, in the present embodiment, the milliwave radar 12 is placed at a position similar to the LiDAR 11. However, the milliwave radar 12 may be placed at a position different from the LiDAR 11. A plurality of the milliwave radars may also be provided in the vehicle 100. The range in which distance can be measured by the milliwave radar 12 is the range Y shown by the one-dot chain line of FIG. 2 (for example, about 200 m). Therefore, the milliwave radar 12 has a longer measurable range than the LiDAR 11 or later explained external vehicle camera 13.

The milliwave radar 12 sends radio waves from a transmission antenna and receives the reflected waves by a receiving antenna. Further, the milliwave radar 12 measures the distance to an object based on the time from emitting the radio waves from the transmission antenna to receiving the reflected waves. In addition, the milliwave radar 12 measures the orientation of the object with respect to the milliwave radar 12 based on the deviation in reception of the reflected waves among the plurality of receiving antennas arranged aligned. The milliwave radar 12 performs signal processing after mixing the radio waves emitted from the transmission antenna and the reflected waves received by the receiving antenna to generate data relating to the positional information of the object. Every time generating data relating to positional information of the object, the milliwave radar 12 outputs the generated data through the internal vehicle network 22 to the ECU 21. Note that, instead of the milliwave radar, a radar using radio waves of another wavelength may also be used so long as able to utilize the radio waves to measure the distance to the object.

The external vehicle camera 13 is a device capturing an object in the range of measurement. Specific objects include, for example, the road and obstructions in the range of measurement. The external vehicle camera 13 has a 2D detector (CCD, C-MOS, etc.) configured by an array of opto-electric conversion elements having sensitivity to visible light and an imaging optical system forming on the 2D detector an image of a region to be captured. In the present embodiment, the external vehicle camera 13 is, for example, attached at the inside of the vehicle 100, in particular, as shown in FIG. 2, at the inside of a front glass, so as to face a region ahead of the vehicle 100. However, the external vehicle camera 13 may also be provided at a location different from the inside of the front glass. A plurality of the external vehicle camera 13 may also be provided at the vehicle 100. The range able to be captured by the external vehicle camera 13 by a certain degree of resolution is the range Z shown by the broken line in FIG. 2. Therefore, in the present embodiment, the measurable range is longer than the LiDAR 11 and the shorter than the milliwave radar 12.

The external vehicle camera 13 captures the region in front of the vehicle 100 every predetermined image capturing cycle period (for example, 1/30 second to 1/10 second), and generates an image in which that front region is shown. The external vehicle camera 13 outputs the generated image through the internal vehicle network 22 to the ECU 21 each time generating an image. Note that, the external vehicle camera 13 may be a single lens camera or may be a stereo camera. If a stereo camera is used as the external vehicle camera 13, the external vehicle camera 13 also functions as a distance measurement sensor measuring the position of an object. Therefore, in this case, the external vehicle camera 13 also functions as a surrounding vehicle position measuring device detecting the position of a surrounding vehicle around the vehicle 100. At the vehicle 100, a plurality of external vehicle cameras differing in direction of capture or focal distance may also be provided.

The position measurement sensor 14 is a sensor measuring a self-position of the vehicle 100. The position measurement sensor 14 is, for example, a GPS (global positioning system) receiver. The GPS receiver receives GPS signals from a plurality of GPS satellites, and measures the self-position of the vehicle 100 based on the received GPS signals. The position measurement sensor 14 outputs the measurement results of the self-position of the vehicle 100 through the internal vehicle network 22 to the ECU 21 with each predetermined cycle period. Note that, the position measurement sensor 14 may also be a receiver based on another satellite position measurement system so long as possible to measure the self-position of the vehicle 100.

The storage device 15, for example, has a hard disk drive or a nonvolatile semiconductor memory. The storage device 15 stores map information. The map information includes, for each predetermined section of the road, information showing a position of the section and road signs (for example, lanes, dividing lines, or stop lines). The storage device 15 reads out map information in accordance with a map information read request from the ECU 21, and sends map information through the internal vehicle network 22 to the ECU 21.

The display device 20 displays information relating to the vehicle 100 and operation of the vehicle 100. In particular, in the present embodiment, the display device 20 functions as a display device displaying dividing line icons corresponding to the dividing lines around the ego vehicle and a vehicle icon corresponding to a surrounding vehicle around the ego vehicle. The display device 20, for example, is a liquid crystal display or organic EL display or other device displaying an image on a screen. Alternatively, the display device 20 may also be a heads up display projecting an image on the window glass at the front of the vehicle 100 or other transparent surface provided at the front of the driver. Whatever the case, the display device 20 may be any type of display so long as able to display an image. The display device 20 is connected through the internal vehicle network 22 to the ECU 21. The display device 20 receives a display signal from the ECU 21, and displays an image corresponding to the received display signal.

Figure 4:
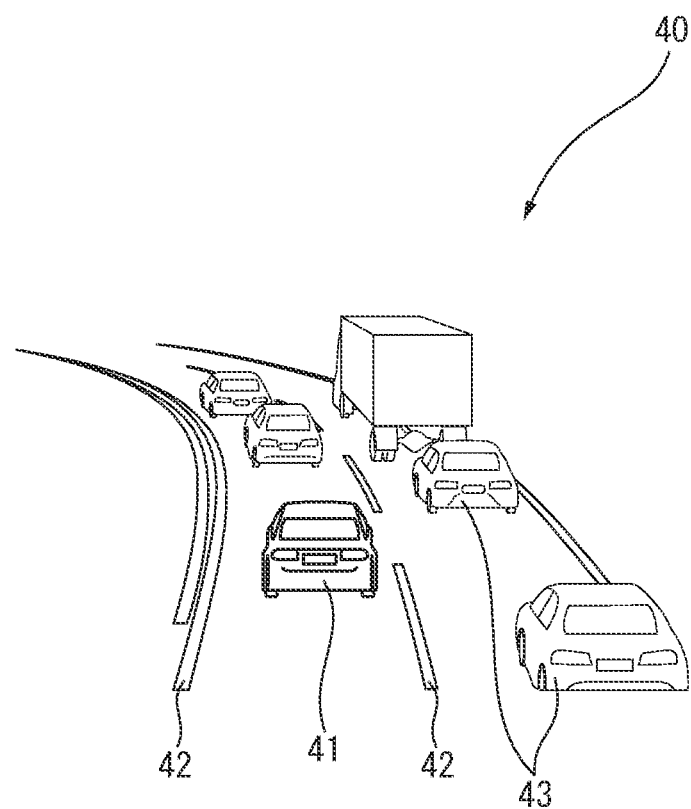
FIG. 4 is a view showing one example of part of a display screen of a display device.

FIG. 4 is a view showing one example of a part of the display screen of the display device 20. At the display device 20, a road condition display region 40 such as shown in FIG. 4 is provided. Road conditions schematically showing the state of the road mainly in front of the vehicle 100 are displayed in this road condition display region 40. Specifically, dividing line icons 42 corresponding to the dividing lines on the road on which the vehicle (ego vehicle) 100 is running, an ego vehicle icon 41 corresponding to the vehicle 100, and a surrounding vehicle icon 43 corresponding to a surrounding vehicle around the vehicle 100 are displayed at the display device 20, as the road conditions. Note that, the display device 20 may also display information other than the road conditions (for example, the speed of the vehicle, temperature outside the vehicle, current time, shift position, water temperature, remaining amount of fuel, various warnings, amount of energy consumption, etc.) in a region other than the road condition display region 40.

Figure 5:
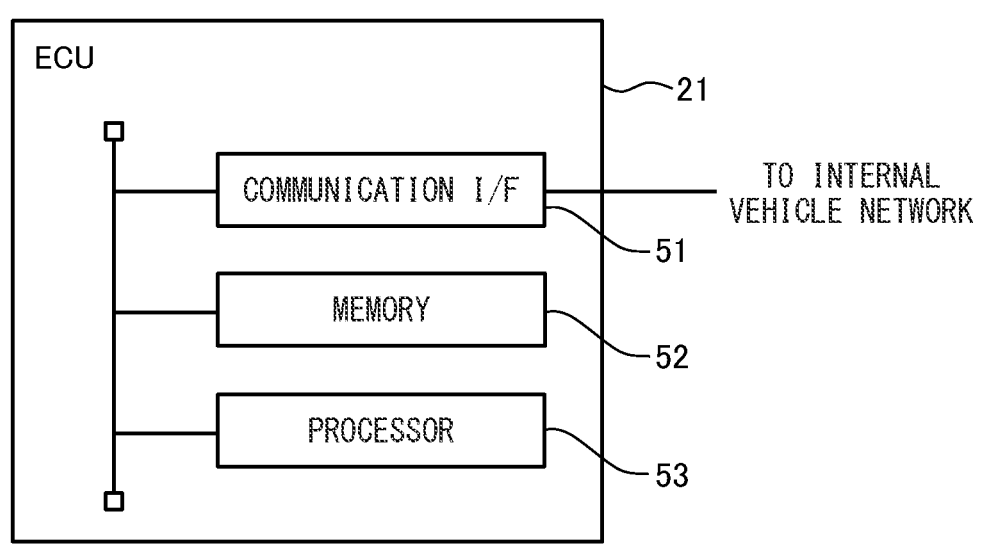
FIG. 5 is a view of a hardware configuration of an ECU, which is one embodiment of a display control device.

The ECU 21 controls the display of the display device 20. In particular, in the present embodiment, the ECU 21 functions as a display control device controlling the display of the dividing line icons 42 and the vehicle icons 41 and 43 at the display device 20. FIG. 5 is a view of the hardware configuration of the ECU 21, which is one embodiment of the display control device. The ECU 21 has a communication interface 51, memory 52, and processor 53. Note that, the communication interface 51, memory 52, and processor 53 may be separate circuits or may be configured as a single integrated circuit.

The communication interface 51 has a communication interface circuit and a device interface circuit. The communication interface circuit is a circuit for connecting the ECU 21 to the internal vehicle network 22. The device interface circuit is a circuit for outputting a display signal to the display device 20.

The communication interface 51 sends, each time receiving point cloud data from the LiDAR 11, received point cloud data to the processor 53. Further, the communication interface 51 sends, each time receiving a signal showing positional information from the milliwave radar 12, the received signal showing positional information to the processor 53. In addition, the communication interface 51 sends, each time receiving an image from the external vehicle camera 13, the received image to the processor 53. Further, the communication interface 51 sends, each time receiving measurement results from the position measurement sensor 14, the measurement results of the self-position to the processor 53. Further, the communication interface 51 sends map information read from the storage device 15 to the processor 53. In addition, the communication interface 51 sends, each time receiving a display signal for the display device 20 from the ECU 21, the received display signal to the display device 20.

The memory 52 is a storage device storing data. The memory 52, for example, has a volatile semiconductor memory and nonvolatile semiconductor memory. The memory 52 stores a program for driving assisting processing performed by the processor 53 of the ECU 21. Further, the memory 52 stores output data of the LiDAR 11, milliwave radar 12, and external vehicle camera 13 and various types of data used in the display processing, etc.

The processor 53 has one or more CPUs (central processing units) and their peripheral circuits. The processor 53 may also further have other processing circuits such as arithmetic logic units or numerical calculation units. The processor 53 performs display processing of the display device 20 to control the display of the display device 20. The processor 53 controls the display to the display device 20 of the dividing line icons 42 corresponding to the dividing lines around the ego vehicle and the surrounding vehicle icon 43 corresponding to a surrounding vehicle around the ego vehicle.

Display Processing of Display Device

Figure 6:
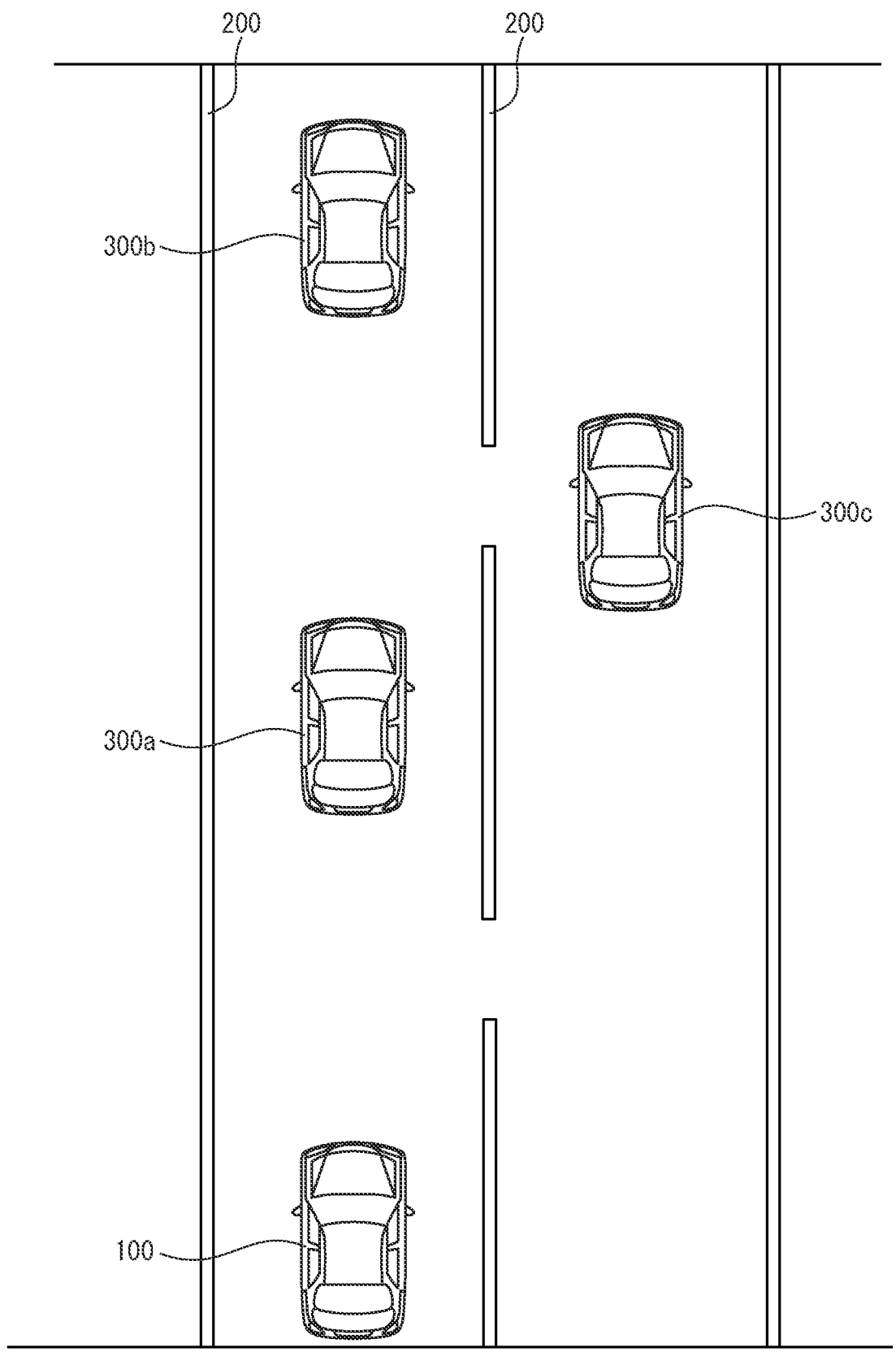
FIG. 6 is a view showing one example of road conditions.

FIG. 6 is a view showing an example of the conditions of the road. FIG. 6 shows certain conditions of the road with two lanes on each side. These lanes are delineated by three dividing lines 200. Further, in the example shown in FIG. 6, the ego vehicle 100 is running in the left side lane. In the road conditions shown in FIG. 6, two surrounding vehicles 300 (first surrounding vehicle 300a and second surrounding vehicle 300b) are running ahead of the ego vehicle 100 in the same lane as the ego vehicle 100, while one surrounding vehicle 300 (third surrounding vehicle 300c) is running ahead of the ego vehicle 100 in the lane adjoining the ego vehicle 100. Below, the surrounding vehicle 300 preceding the ego vehicle 100 in the same lane as the ego vehicle 100 and running immediately in front of the ego vehicle 100 (first surrounding vehicle 300a in FIG. 6) will be called the "preceding vehicle", while the surrounding vehicle 300 preceding the preceding vehicle and running immediately in front of the preceding vehicle (second surrounding vehicle 300b in FIG. 6) will be called the "further preceding vehicle".

In particular, in the example shown in FIG. 6, the first surrounding vehicle 300a is positioned inside the range of measurement of the LiDAR 11 of the ego vehicle 100. The measurement precision of position by the LiDAR 11 is extremely high, therefore the position of the first surrounding vehicle 300a can be measured relatively accurately.

On the other hand, the second surrounding vehicle 300b is positioned ahead of the first surrounding vehicle 300a. Therefore, the second surrounding vehicle 300b is hidden by the first surrounding vehicle 300a, and therefore cannot be seen from the ego vehicle 100. The LiDAR 11 can only measure the position of an object which can be directly seen from the position of the LiDAR 11, therefore the position of the second surrounding vehicle 300b is difficult to be measured by the LiDAR 11. In addition, the second surrounding vehicle 300b is positioned outside of the range of measurement of the LiDAR 11. Therefore, due to this as well, the position of the second surrounding vehicle 300b is hard to be measured by the LiDAR 11.

On the other hand, even for an object not directly visible from the position of the milliwave radar 12, the milliwave radar 12 sometimes can measure the position of the object by, for example, the radio waves being reflected at the ground surface. Further, the second surrounding vehicle 300b is positioned inside the range of measurement by the milliwave radar 12 of the ego vehicle 100. Therefore, the milliwave radar 12 can measure the position of the second surrounding vehicle 300b whose position cannot be measured by the LiDAR 11. However, the measurement precision of position by the milliwave radar 12 is lower than the measurement precision by the LiDAR 11. In particular, the measurement precision of the position in the left-right direction by the milliwave radar 12 is lower than the measurement precision of the position in the left-right direction by the LiDAR 11. Therefore, the position of the second surrounding vehicle 300b, in particular the position in the left-right direction, cannot be that accurately measured.

Further, the third surrounding vehicle 300c running in the adjoining lane of the ego vehicle 100 is also positioned outside of the range of measurement of the LiDAR 11. Therefore, the position of the third surrounding vehicle 300c is difficult to be measured by the LiDAR 11. On the other hand, the third surrounding vehicle 300c is positioned inside the ranges of measurement of the milliwave radar 12 and the external vehicle camera 13 of the ego vehicle 100. Therefore, the position of the third surrounding vehicle 300c can be measured by the milliwave radar 12 and the external vehicle camera 13. However, the measurement precision of position by the external vehicle camera 13 is also lower than the measurement precision of the LiDAR 11. Therefore, the position of the third surrounding vehicle 300c cannot be that accurately measured.

Figure 7:
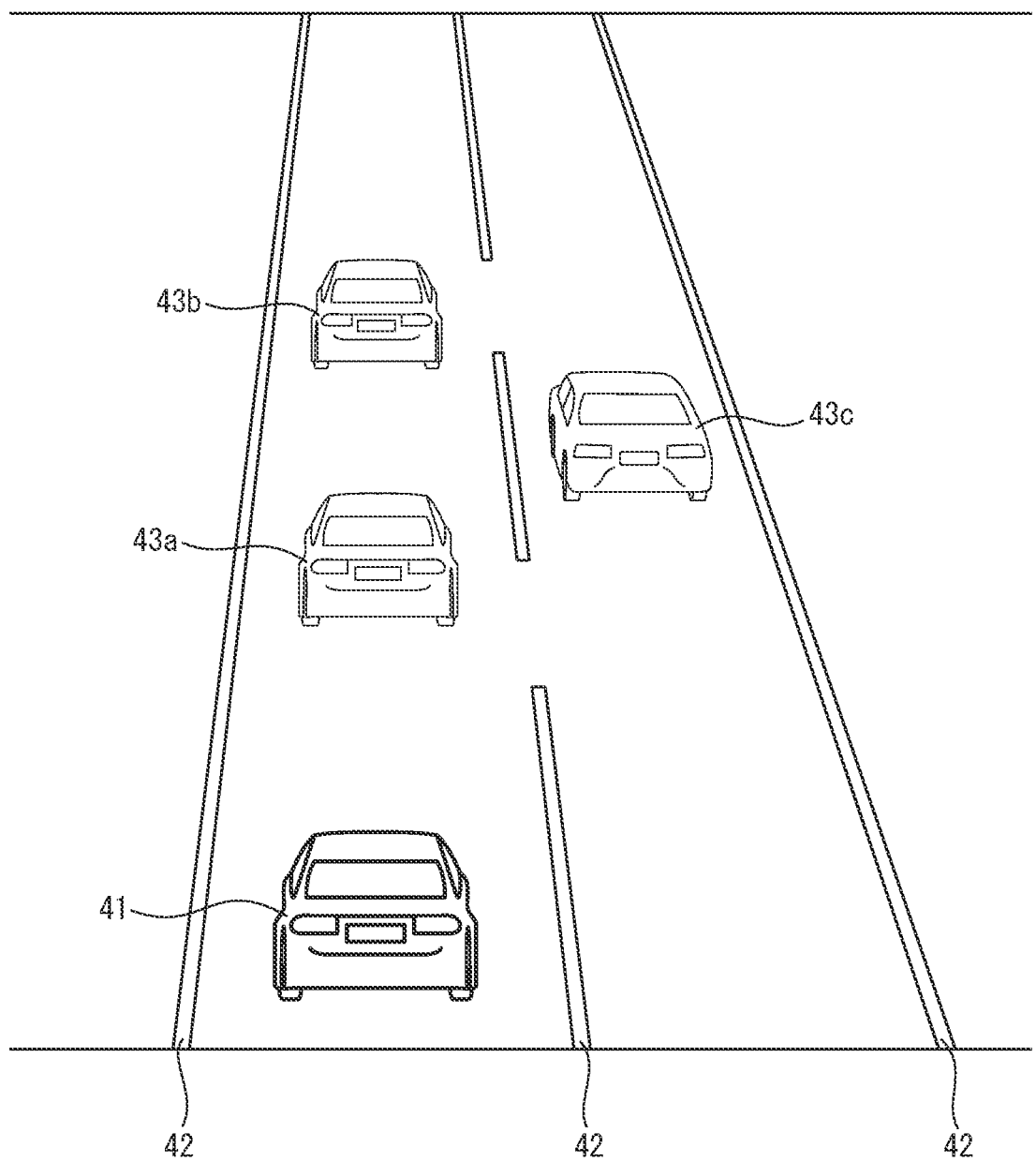
FIG. 7 is a view showing a display of a road condition display region of a display device when the road conditions are the conditions such as shown in FIG. 6.

FIG. 7 is a view showing a display at a road condition display region 40 of the display device 20 when the road conditions are the conditions such as shown in FIG. 6. As shown in FIG. 7, on the display device 20, an ego vehicle icon 41 corresponding to the ego vehicle 100, dividing line icons 42 corresponding to dividing lines 200 on the road, and surrounding vehicle icons 43 corresponding to the surrounding vehicles 300 are displayed.

The ego vehicle icon 41 is basically always displayed at the same position of the display device 20. In particular, in the present embodiment, the ego vehicle icon 41 is displayed below the center of the road condition display region 40 of the display device 20. The ego vehicle icon 41 is displayed by a separate color or separate shape from the surrounding vehicle icons 43.

The display positions of the dividing line icons 42 are specified based on the self-position measured by the position measurement sensor 14 and map information stored in the storage device 15. Specifically, the relative positions, with respect to the ego vehicle 100, of the dividing lines 200 around the ego vehicle 100 are identified based on the measured self-position and map information relating to the dividing lines around the self-position. Further, the dividing line icons 42 are displayed at display positions corresponding to the calculated relative positions.

Note that, the display positions of the dividing line icons 42 may be specified based on an image captured by the external vehicle camera 13. In this case, using image recognition processing, the dividing lines captured in the image are recognized. As the image recognition processing, a neural network, support vector machine, or other known pattern recognition technique is used. Further, the relative positions of the dividing lines 200 with respect to the ego vehicle 100 are calculated based on the positions, in the image, of the recognized dividing lines. Further, the dividing line icons 42 are displayed at display positions corresponding to the calculated relative positions. Further, the display positions of the dividing line icons 42 may also be specified based on both of the output of the position measurement sensor 14 and map information, and an image captured by the external vehicle camera 13.

The display position of the first surrounding vehicle icon 43a corresponding to the first surrounding vehicle 300a is specified based on the relative position of the first surrounding vehicle 300a with respect to the ego vehicle 100 calculated based on the point cloud data. Therefore, the first surrounding vehicle icon 43a is displayed at a display position in the front-back direction, corresponding to the relative position in the front-back direction identified based on the output of the LiDAR 11. Further, the first surrounding vehicle icon 43a is displayed at a display position in the left-right direction, corresponding to the relative position in the left-right direction identified based on the output of the LiDAR 11.

On the other hand, as explained above, the position of the second surrounding vehicle 300b is not measured by the LiDAR 11, but is measured by the milliwave radar 12. Therefore, the display position of the second surrounding vehicle icon 43b corresponding to the second surrounding vehicle 300b is basically specified based on the positional information output from the milliwave radar 12. However, as explained above, the measurement precision of the position in the left-right direction by the milliwave radar 12 is not that high.

Therefore, in the present embodiment, the relative position in the front-back direction of the second surrounding vehicle 300b with respect to the ego vehicle 100 is calculated based on the output of the milliwave radar 12. Further, the second surrounding vehicle icon 43b is displayed at the display position in the front-back direction corresponding to the calculated relative position in the front-back direction. On the other hand, in specifying the display position in the left-right direction of the second surrounding vehicle icon 43b, the relative position in the left-right direction of the second surrounding vehicle 300b with respect to the ego vehicle 100 is calculated based on the output of the milliwave radar 12. Further, based on the relative positions of the dividing lines 200 calculated in the above-mentioned way, the relative position of the lane on the road with respect to the ego vehicle 100 in the region in the front-back direction where the second surrounding vehicle 300b is positioned, is calculated. Based on the relative position of the center of the lane calculated and the relative position in the left-right direction of the second surrounding vehicle 300b calculated based on the output of the milliwave radar 12, the display position in the left-right direction of the second surrounding vehicle icon 43b is specified. Specifically, in the present embodiment, the display position in the left-right direction of the second surrounding vehicle icon 43b is set to a position of the center in the left-right direction of the lane closest to the relative position in left-right direction of the second surrounding vehicle 300b calculated based on the output of the milliwave radar 12.

Further, the position of the third surrounding vehicle 300c is not measured by the LiDAR 11, but is measured by the milliwave radar 12. Specifically, the relative position in the front-back direction of the third surrounding vehicle 300c with respect to the ego vehicle 100 is calculated based on the output of the milliwave radar 12. Further, based on the relative positions of the dividing lines 200 calculated in the above way, the relative positions of the lanes on the road with respect to the ego vehicle 100 in the region in the front-back direction where the third surrounding vehicle 300c is positioned, are calculated. Based on the relative positions of the centers of the lanes calculated and the relative position in the left-right direction of the third surrounding vehicle 300c calculated based on the output of the milliwave radar 12, the display position in the left-right direction of the third surrounding vehicle icon 43c is specified. Specifically, in the present embodiment, the display position in the left-right direction of the third surrounding vehicle icon 43c is set to a position of the center in the left-right direction of the lane closest to the relative position in the left-right direction of the third surrounding vehicle 300c calculated based on the output of the milliwave radar 12.

In this way, in the present embodiment, for a surrounding vehicle 300 whose positional information can be measured by the LiDAR 11, the surrounding vehicle icon 43 is displayed based on the corresponding positional information measured by the LiDAR 11. On the other hand, for a surrounding vehicle 300 whose positional information cannot be measured by the LiDAR 11, the surrounding vehicle icon 43 is displayed based on the positional information in the front-back direction measured by the milliwave radar 12 and the positional information of the dividing lines (or lanes).

Note that, in the above embodiment, the second surrounding vehicle icon 43b and the third surrounding vehicle icon 43c are both displayed at the centers of the lanes. However, a surrounding vehicle icon corresponding to a surrounding vehicle identified in position by these surrounding vehicle position measuring devices other than the LiDAR need not necessarily be displayed at the center of the lane so long as the surrounding vehicle icon fits in the lane.

Further, in the above embodiment, if it is not possible to measure the positional information by the LiDAR, the corresponding surrounding vehicle icons 43 are displayed, based on the positional information of the surrounding vehicles 300 measured by the milliwave radar 12. However, in this case, the corresponding surrounding vehicle icons 43 may be displayed based on the positional information of the surrounding vehicles 300 measured by a device other than the milliwave radar 12. Specifically, for example, the positional information of the surrounding vehicles 300 is calculated based on an image captured by the external vehicle camera 13, and the corresponding vehicle icons 43 are displayed based on the calculated positional information.

Display Control

Figure 8:
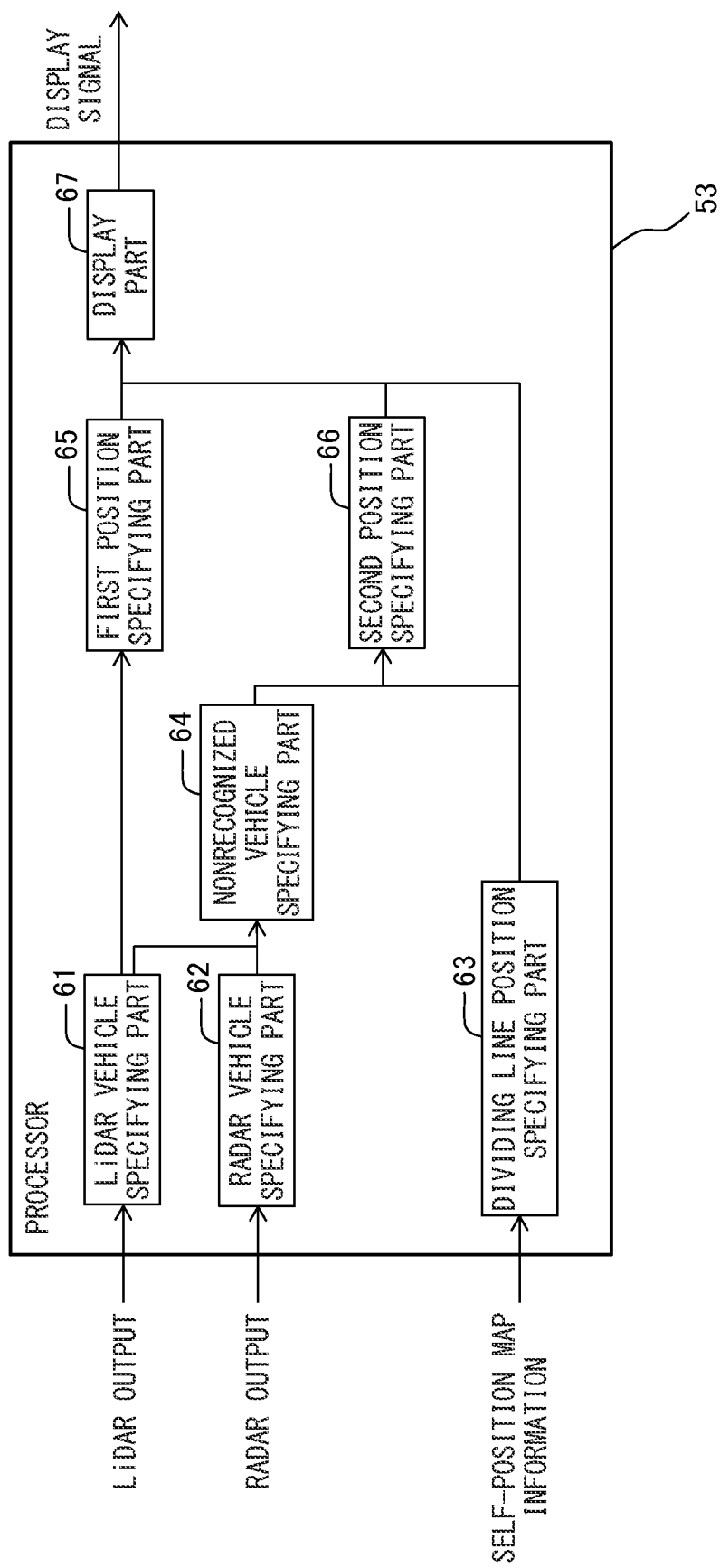
FIG. 8 is a functional block diagram of a processor of an ECU relating to control of a display operation on the road condition display region of the display device.

FIG. 8 is a functional block diagram of the processor 53 of the ECU 21 relating to control of display to the road condition display region 40 of the display device 20. The processor 53 has a LiDAR vehicle specifying part 61, radar vehicle specifying part 62, dividing line position specifying part 63, nonrecognized vehicle specifying part 64, first position specifying part 65, second position specifying part 66, and display part 67. These functional blocks of the processor 53 are, for example, functional modules realized by a computer program operating on the processor 53. Alternatively, these functional blocks of the processor 53 may also be dedicated processing circuits provided at the processor 53.

The LiDAR vehicle specifying part 61 specifies the positions of the surrounding vehicles 300 around the ego vehicle 100, based on the output of the LiDAR 11. For example, point cloud data output from the LiDAR 11 is input to the LiDAR vehicle specifying part 61. The LiDAR vehicle specifying part 61 performs recognition processing based on the point cloud data to thereby recognize the surrounding vehicles 300 around the ego vehicle 100 from the point cloud data. Specifically, the LiDAR vehicle specifying part 61, for example, groups the point cloud data into groups of data of equal distances, and puts together related groups to group them into groups representing object marks. The groups of object marks put together in this way correspond to some sorts of objects around the ego vehicle 100. Further, the LiDAR vehicle specifying part 61 extracts the groups of object marks corresponding to the surrounding vehicles 300 from these groups to recognize the surrounding vehicles 300 around the ego vehicle 100. Further, based on the center positions of the groups of object marks corresponding to the recognized surrounding vehicles 300, the LiDAR vehicle specifying part 61 specifies the positions of the surrounding vehicles 300 corresponding to the groups of object marks. Specifically, the LiDAR vehicle specifying part 61 specifies the relative positions in the front-back direction of the surrounding vehicles 300 with respect to the ego vehicle 100 and the relative positions in the left-right direction of the surrounding vehicles 300 with respect to the ego vehicle 100. The LiDAR vehicle specifying part 61 inputs the specified positions of the surrounding vehicles 300 to the nonrecognized vehicle specifying part 64 and first position specifying part 65.

The radar vehicle specifying part 62 specifies the positions of the surrounding vehicles 300 around the ego vehicle 100 based on the output of the milliwave radar 12. At the radar vehicle specifying part 62, for example, data relating to positional information output from the milliwave radar 12 is input. The radar vehicle specifying part 62 performs recognition processing to thereby recognize the surrounding vehicles 300 around the ego vehicle 100 from the data relating to positional information. Further, based on the data corresponding to the recognized surrounding vehicles 300, it specifies the positions of the recognized surrounding vehicles 300. Specifically, the radar vehicle specifying part 62 specifies the relative positions in the front-back direction of the surrounding vehicles 300 with respect to the ego vehicle 100 and the relative positions in the left-right direction of the surrounding vehicles 300 with respect to the ego vehicle 100. The radar vehicle specifying part 62 inputs the specified relative positions of the surrounding vehicles 300 to the nonrecognized vehicle specifying part 64.

Note that, in the present embodiment, the radar vehicle specifying part 62 specifies the positions of the surrounding vehicles 300 around the ego vehicle 100, based on the output of the milliwave radar 12. However, instead of the radar vehicle specifying part 62, a vehicle specifying part specifying the positions of the surrounding vehicles 300 based on the output of a device other than the LiDAR 11 different from the milliwave radar 12 may be provided. Specifically, for example, a camera vehicle specifying part specifying the positions of the surrounding vehicles 300 around the ego vehicle 100 based on the output of the external vehicle camera 13 may also be provided.

The dividing line position specifying part 63 specifies the positions of the dividing lines 200 around the ego vehicle 1M. At the dividing line position specifying part 63, for example, the self-position of the vehicle 100 measured by the position measurement sensor 14 and the map information stored in the storage device 15 are input. The dividing line position specifying part 63 specifies the dividing lines positioned around the self-position of the vehicle 100 from map information of the road on which the vehicle 100 is running. Further, the dividing line position specifying part 63 specifies the relative positions of the specified dividing lines 200 with respect to the ego vehicle 100. The dividing line position specifying part 63 inputs the specified relative positions of the dividing lines 200 to the second position specifying part 66. In addition, the dividing line position specifying part 63 judges the specified relative positions of the dividing lines 200 as the display positions of the dividing line icons 42 corresponding to the dividing lines 200. The dividing line position specifying part 63 inputs the specified display positions of the dividing line icons 42 to the display part 67.

Alternatively, the dividing line position specifying part 63 may also specify the positions of the dividing lines 200, based on an image captured by the external vehicle camera 13. In this case, in the dividing line position specifying part 63, for example, an image captured by the external vehicle camera 13 is input. The dividing line position specifying part 63 recognizes dividing lines of the road on which the ego vehicle 100 is running by image recognition processing, and identifies the relative positions of the dividing lines around the vehicle 100 based on the recognized dividing lines. In addition, the dividing line position specifying part 63 specifies the relative positions of the specified dividing lines 200 as display positions of the dividing line icons 42 corresponding to the dividing lines 200.

The nonrecognized vehicle specifying part 64 specifies surrounding vehicles 300 which were not specified in position by the LiDAR vehicle specifying part 61 among the surrounding vehicles 300 around the ego vehicle 100 which were specified in position by the radar vehicle specifying part 62. The positions of the surrounding vehicles 300 specified by the LiDAR vehicle specifying part 61 and the positions of the surrounding vehicles 300 specified by the radar vehicle specifying part 62 are input to the nonrecognized vehicle specifying part 64. Based on the input positions of the surrounding vehicles 300, the nonrecognized vehicle specifying part 64 specifies surrounding vehicles 300 around which there are no surrounding vehicles 300 specified by the LiDAR vehicle specifying part 61, among the plurality of surrounding vehicles 300 specified by the radar vehicle specifying part 62. Further, the nonrecognized vehicle specifying part 64 specifies surrounding vehicles 300 specified in this way as surrounding vehicles 300 which were not specified in position by the LiDAR vehicle specifying part 61 (below, referred to as a "surrounding vehicles not recognized by the LiDAR"). The nonrecognized vehicle specifying part 64 inputs the relative positions of specified surrounding vehicles 30) not recognized by the LiDAR to the second position specifying part 66.

The first position specifying part 65 specifies the display positions of the surrounding vehicle icons 43 corresponding to the surrounding vehicles 300 measured in position by the LiDAR 11. The positions of the surrounding vehicles 300 specified by the LiDAR vehicle specifying part 61 are input to the first position specifying part 65. The first position specifying part 65 specifies the display positions corresponding to the relative positions in the front-back direction of the surrounding vehicles 300 with respect to the ego vehicle 100, specified by the LiDAR vehicle specifying part 61, as the display positions in the front-back direction of the surrounding vehicle icons 43 corresponding to the surrounding vehicles 300. In addition, the first position specifying part 65 specifies the positions corresponding to the relative positions in the left-right direction of the surrounding vehicles 300 with respect to the ego vehicle 100, specified by the LiDAR vehicle specifying part 61, as the display positions in the left-right direction of the surrounding vehicle icons 43 corresponding to the surrounding vehicles 300. The first position specifying part 65 inputs the specified display positions of the surrounding vehicle icons 43 to the display part 67.

The second position specifying part 66 specifies the display positions of the surrounding vehicle icons 43 corresponding to the surrounding vehicles 300 not measured in position by the LiDAR 11. The relative positions of the surrounding vehicles 300 not recognized by the LiDAR specified by the nonrecognized vehicle specifying part 64 and the relative positions of the dividing lines 200 specified by the dividing line position specifying part 63 are input to the second position specifying part 66. Based on the relative positions in the front-back direction of the surrounding vehicles 300 not recognized by the LiDAR, the relative positions in the left-right direction of the surrounding vehicles 300 not recognized by the LiDAR, and the relative positions of the dividing lines 200, the second position specifying part 66 estimates the positions in the left-right direction in the lanes closest to the positions in the left-right direction of the surrounding vehicles 300.

Figure 9:
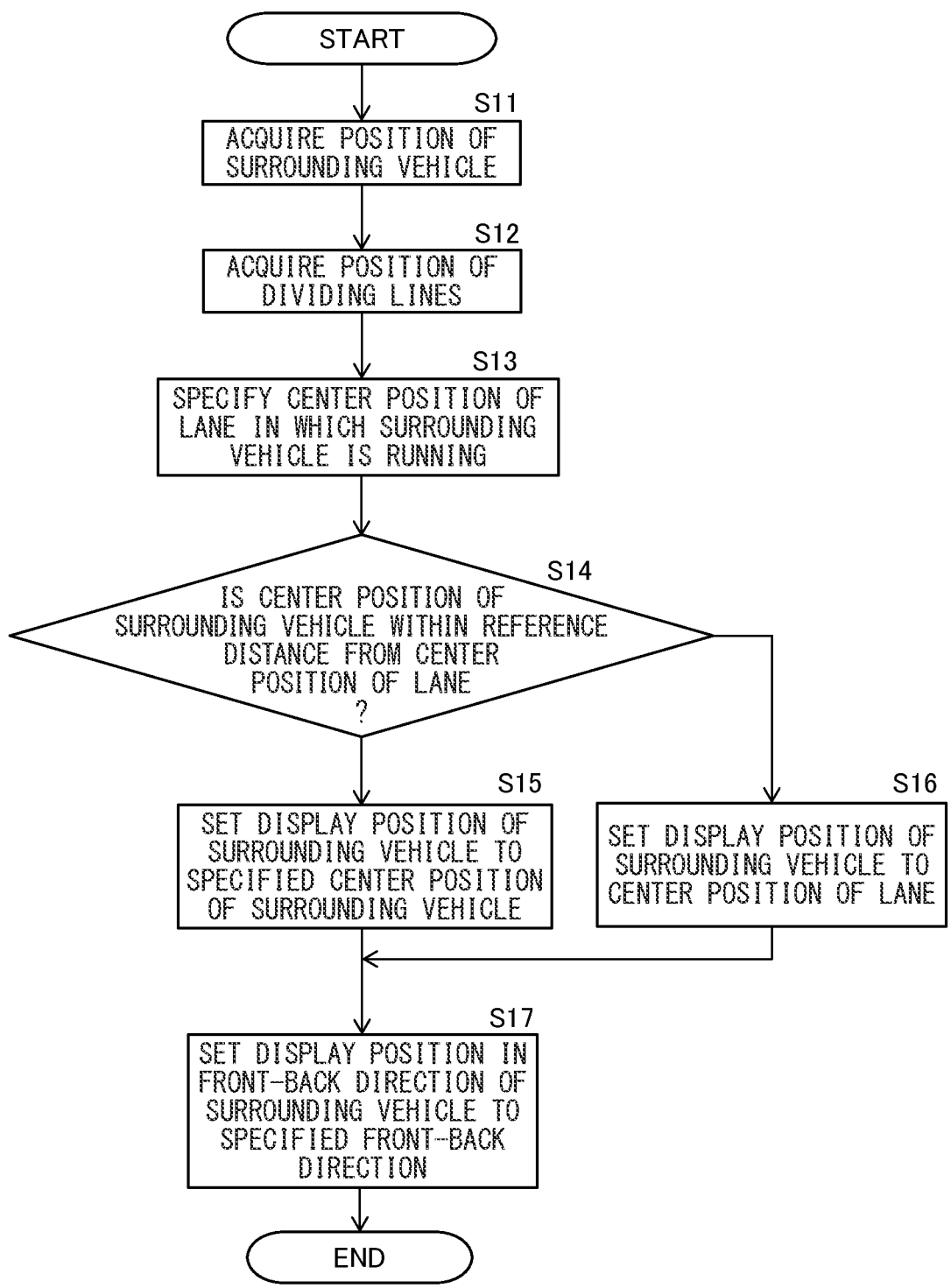
FIG. 9 is a flow chart of position specifying processing of a surrounding vehicle not found by LiDAR, performed by a second position specifying part.

FIG. 9 is a flow chart of processing for specifying the position of a surrounding vehicle 300 not recognized by the LiDAR, performed by the second position specifying part 66. As shown in FIG. 9, the second position specifying part 66 first acquires the relative positions of the surrounding vehicle 300 not recognized by the LiDAR specified by the nonrecognized vehicle specifying part 64 (step S11). Next, the second position specifying part 66 acquires the relative positions of the dividing lines 200 specified by the dividing line position specifying part 63 (step S12).

After that, based on the acquired relative positions of the surrounding vehicle 300 not recognized by the LiDAR (relative position in front-back direction and relative position in left-right direction) and the relative positions of the dividing lines 200, the second position specifying part 66 calculates the center position in the left-right direction of the lane in which the surrounding vehicle 300 is running (step S13). Specifically, the center positions in the left-right direction of the plurality of lanes at acquired relative position in the front-back direction of the surrounding vehicle 300 (running lane of ego vehicle 100 and other lanes with same advancing direction as this running lane) are calculated. Further, the second position specifying part 66 specifies the center position of the lane with a center position positioned closest to the acquired position in the left-right direction of this surrounding vehicle 300 among these plurality of lanes, as the center position in the left-right direction of the lane in which this surrounding vehicle 300 is running.

Next, the second position specifying part 66 judges if the center position in the left-right direction of the surrounding vehicle 300 specified by the nonrecognized vehicle specifying part 64 is within a predetermined reference distance from the center position in the left-right direction of the corresponding lane specified at step S13 (step S14). The reference distance is set to a distance of equal to or less than half of the width of each lane. If at step S14 it is judged that the specified center position in the left-right direction of each surrounding vehicle 300 is within the reference distance from the center position in the left-right direction of the corresponding lane, the second position specifying part 66 specifies the position in the left-right direction of the surrounding vehicle 300 specified by the nonrecognized vehicle specifying part 64, as the display position in the left-right direction of the surrounding vehicle icon 43 corresponding to that surrounding vehicle 300 (step S15). On the other hand, if at step S14 it is judged that the center position in the left-right direction of each specified surrounding vehicle 300 is separated by more than the reference distance from the center position in the left-right direction of the corresponding lane, the second position specifying part 66 specifies the center position in the left-right direction of the corresponding lane, as the display position in the left-right direction of the surrounding vehicle icon 43 corresponding to that surrounding vehicle 300 (step S16). Further, the second position specifying part 66 specifies the position in the front-back direction of the surrounding vehicle 300 specified by the nonrecognized vehicle specifying part 64, as the display position in the front-back direction of the surrounding vehicle icon 43 corresponding to that surrounding vehicle 300 (step S17). The display position in the left-right direction and the display position in the front-back direction of each surrounding vehicle 300 specified by the second position specifying part 66 in this way are input to the display part 67.

The display part 67 outputs a display signal to the display device 20. The display position of the surrounding vehicle icon 43 specified by the first position specifying part 65, the display position of the surrounding vehicle icon 43 specified by the second position specifying part 66, and the relative positions of the dividing lines 200 specified by the dividing line position specifying part 63 are input to the display part 67. The display part 67 specifies the display positions of the dividing line icons 42, based on the relative positions of the dividing lines 200 specified by the dividing line position specifying part 63. Further, the display part 67 outputs a display signal to the display device 20 so that the surrounding vehicle icons 43 and dividing line icons 42 are displayed at the specified display positions. Further, the display part 67 outputs a display signal to the display device 20 so that the ego vehicle icon 41 is constantly displayed at the same position. As a result, at the display device 20, a display such as shown in FIGS. 4 and 7 is performed.

Advantageous Effects

As explained above, the LiDAR 11 can only measure the position of a surrounding vehicle directly visible from the position of the LiDAR 11. Further, the range of measurement of the LiDAR 11 is relatively short, therefore it is not possible to measure the positions of surrounding vehicles running at distant locations. Therefore, for measurement of the positions of these surrounding vehicles, for example, the milliwave radar 12 or another measurement device different from the LiDAR 11 is used. However, the measurement precision of position in the milliwave radar 12 or other measurement device is lower than the measurement precision of position in the LiDAR 11. For this reason, if using the measurement data of the positions of the surrounding vehicles 300 in the milliwave radar 12 or other measurement device as it is to display the surrounding vehicle icons 43 on the display device 20, the positions of the surrounding vehicle icons 43 is displayed flickering or otherwise the surrounding vehicle icons 43 cannot be displayed at suitable display positions.

As opposed to this, according to the vehicle-mounted display system according to the above embodiment, the second position specifying part 66 specifies the display positions in the front-back direction corresponding to the positions in the front-back directions of the surrounding vehicles 300 measured by a surrounding vehicle position measuring device other than the LiDAR 11 and the display positions in the left-right direction corresponding to the positions in the left-right direction in the lanes in which the surrounding vehicles are running, as the display positions of the surrounding vehicle icons 43 corresponding to the surrounding vehicles 300. That is, in the present embodiment, the surrounding vehicles 300 recognized by the milliwave radar 12 or other measurement device are displayed at the centers of the corresponding lanes. As a result, the surrounding vehicle icons 43 corresponding to the surrounding vehicles 300 recognized by the milliwave radar 12 or other measurement device are no longer displayed flickering and therefore the surrounding vehicle icons 43 can be displayed at suitable display positions.

In this regard, a further preceding vehicle basically cannot be measured in position by the LiDAR 11, since a preceding vehicle is present between it and the ego vehicle 100. Therefore, the further preceding vehicle basically is specified in position by the milliwave radar 12, which is a surrounding vehicle position measuring device other than the LiDAR 11. Therefore, it can be said that when the positions of the preceding vehicle running ahead of the ego vehicle 100 in the same lane and the further preceding vehicle running ahead of that preceding vehicle in the same lane are specified by the surrounding vehicle position measuring device, the display control device of the vehicle-mounted display system according to the present embodiment makes the surrounding vehicle icon corresponding to the preceding vehicle be displayed at a display positions in the front-back direction and left-right direction corresponding to the positions in the front-back direction and left-right direction of the preceding vehicle specified by the surrounding vehicle position measuring device and makes the surrounding vehicle icon corresponding to the further preceding vehicle be displayed at a display position in the front-back direction corresponding to the position in the front-back direction of the further preceding vehicle specified by the surrounding vehicle position measuring device and a display position in the left-right direction corresponding to the position in the left-right direction in the lane in which the further preceding vehicle is running.

Modifications

Above, a preferred embodiment according to the present invention was explained, but the present invention is not limited to this embodiment and can be corrected and changed in various ways within the language of the claims.

For example, the second position specifying part 66 may also specify the relative position in the left-right direction of a surrounding vehicle 300 not recognized by the LiDAR, based on an image of the surrounding vehicle 300 captured by the external vehicle camera 13. The technique for specifying the relative position in the left-right direction of the surrounding vehicle 300 in this case will be explained with reference to FIG. 10.

Figure 10:
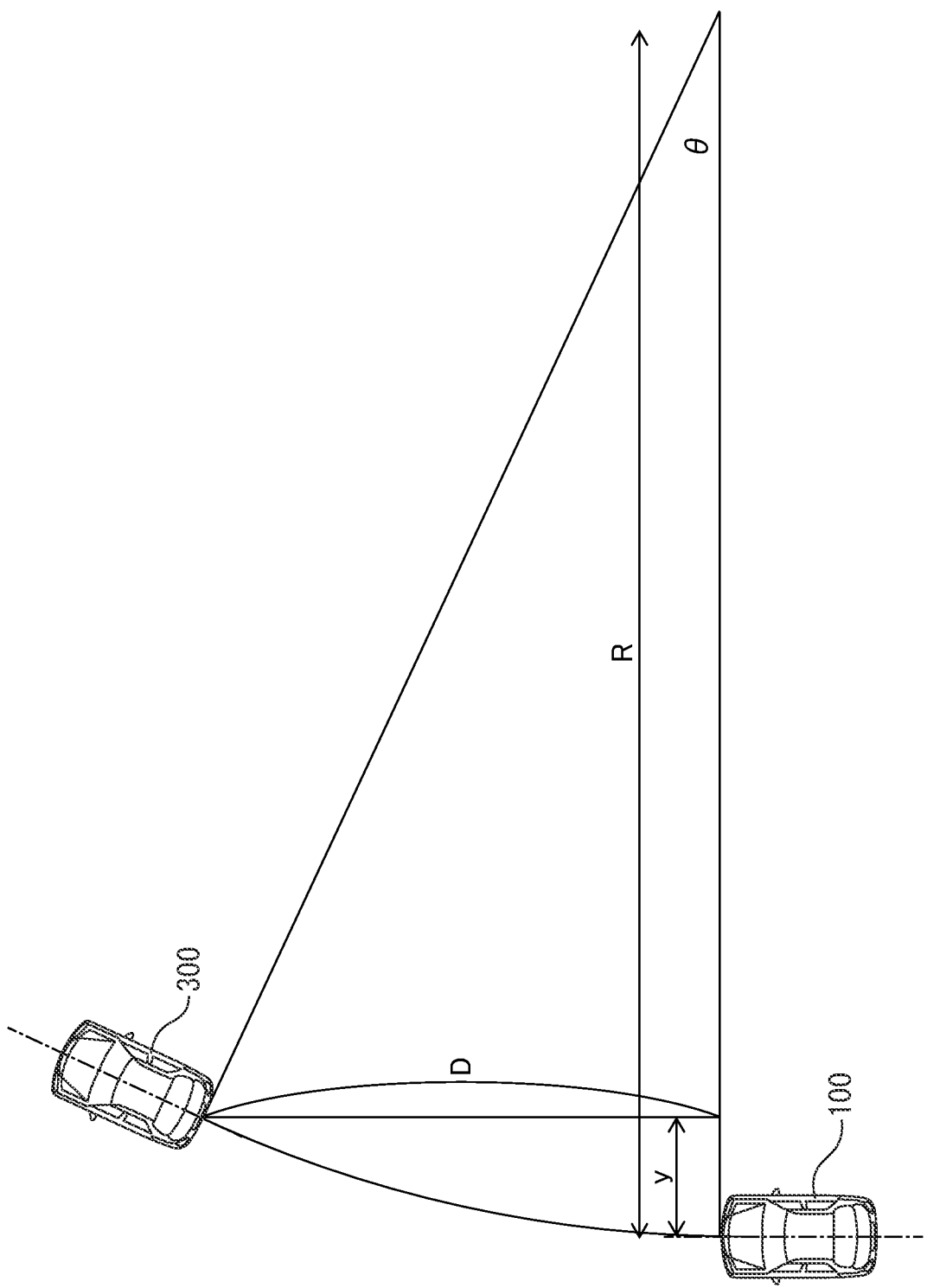
FIG. 10 is a view showing a positional relation of an ego vehicle and a surrounding vehicle.

FIG. 10 is a view showing a positional relationship between the ego vehicle 100 and a surrounding vehicle 300 not recognized by the LiDAR. When the ego vehicle 100 and the surrounding vehicle 300 are in a positional relationship such as shown in FIG. 10, the surrounding vehicle 300 is represented in a state where the advancing direction is slanted in the image captured by the external vehicle camera 13. The second position specifying part 66 calculates an angle θ of an advancing direction of the surrounding vehicle 300 with respect to the advancing direction of the ego vehicle 100, by image recognition processing, based on the image of the second surrounding vehicle captured by the external vehicle camera 13. Further, the relative position of the surrounding vehicle 300 not recognized by the LiDAR is input from the nonrecognized vehicle specifying part 64 to the second position specifying part 66. Therefore, a distance D in the front-back direction from the ego vehicle 100 to the surrounding vehicle 300 is input to the second position specifying part 66.

If assuming the radius of curvature R of the road on which ego vehicle 100 and the surrounding vehicle 300 are running to be constant between the ego vehicle 100 and the surrounding vehicle 300, the radius of curvature R of the road is represented by the following formula (1). Further, the distance "y" in the left-right direction between the ego vehicle 100 and the surrounding vehicle 300 is represented by the following formula (2).

$$R = D/\tan\theta \qquad (1)$$

$$y = R(1-\cos\theta) \qquad (2)$$

That is, in the present modification, the relative position in the left-right direction of the surrounding vehicle 300 with respect to the ego vehicle 100 is specified based on the relative angle of the surrounding vehicle 300 with respect to the ego vehicle 100 and the relative position in the front-back direction of the surrounding vehicle 300 with respect to the ego vehicle. In the present modification, in the same way as step S14 of FIG. 9, the second position specifying part 66 judges if the relative position in the left-right direction of the surrounding vehicle 300 specified by the nonrecognized vehicle specifying part 64 is within a predetermined reference distance from the thus specified position in the left-right direction of the surrounding vehicle 300. Further, if within the reference distance, the relative position in the left-right direction of the surrounding vehicle 300 specified using the above relative angle is specified as the display position in the left-right direction of the surrounding vehicle icon 43 corresponding to that surrounding vehicle 300. On the other hand, if separated by more than the reference distance, in the same way as step S16, the center position in the left-right direction of the corresponding lane is specified as the display position in the left-right direction of the surrounding vehicle icon 43 corresponding to the surrounding vehicle 300.

Note that, when the ego vehicle 100 is changing lanes, it is not possible to suitably calculate the position in the left-right direction of the surrounding vehicle 300. Therefore, in the present modification, if the ego vehicle 100 is changing lanes, the second position specifying part 66 specifies the display positions in the front-back direction and left-right direction corresponding to the positions in the front-back direction and left-right direction of that surrounding vehicle 300 measured by the surrounding vehicle position measuring device, as the display position of the surrounding vehicle icon corresponding to the surrounding vehicle 300.

The invention claimed is:

1. A vehicle-mounted display system displaying an ego vehicle and surrounding vehicles around the ego vehicle, the vehicle-mounted display system comprising:
   a LiDAR measuring a position of a first surrounding vehicle around the ego vehicle;
   a surrounding vehicle position measuring device measuring a position of a second surrounding vehicle around the ego vehicle not measured in position by the LiDAR;
   a display device displaying dividing line icons corresponding to dividing lines around the ego vehicle and surrounding vehicle icons corresponding to the surrounding vehicles around the ego vehicle, the surrounding vehicle icons having at least one of a different shape and a different color from an ego vehicle icon displayed by the display device, and
   a controller controlling display of the dividing line icons and the surrounding vehicle icons at the display device, wherein
   the controller is configured to specify a display position in a front-back direction corresponding to a position in the front-back direction of the second surrounding vehicle measured by the surrounding vehicle position measuring device and a display position in a left-right direction corresponding to a position in the left-right direction based on a center position of a lane in which the second surrounding vehicle is running, as a display position of a surrounding vehicle icon corresponding to the second surrounding vehicle, and
   the controller is configured to estimate the center position in the left-right direction of the lane in which the second surrounding vehicle is running, based on a position in the front-back direction of the second surrounding vehicle and, when a distance between the estimated center position in the left-right direction of the lane and a center position in the left-right direction of the second surrounding vehicle measured by the surrounding vehicle position measuring device is equal to or less than a predetermined distance, make the surrounding vehicle icon corresponding to the second surrounding vehicle be displayed at a display position in the front-back direction and left-right direction corresponding to the positions in the front-back direction and left-right direction of the second surrounding vehicle measured by the surrounding vehicle position measuring device.

2. The vehicle-mounted display system according to claim 1, wherein the controller is configured to specify display positions in the front-back direction and left-right direction of the first surrounding vehicle measured in position by the LiDAR, as a display position of the surrounding vehicle icon corresponding to the first surrounding vehicle.

3. The vehicle-mounted display system according to claim 1, wherein
   the controller is configured to specify positions of dividing lines of a road on which the ego vehicle is running based on map information of the road on which the ego vehicle is running, and specify the specified positions of the dividing lines as display positions of dividing line icons corresponding to the dividing lines, and
   the controller is configured to estimate a position in the left-right direction in a lane closest to the position of the second surrounding vehicle in the left-right direction, based on the specified positions of the dividing lines and the position in the front-back direction of the second surrounding vehicle.

4. The vehicle-mounted display system according to claim 1,
   further comprising an external vehicle camera capturing a road around the ego vehicle, wherein
   the controller is configured to specify positions of dividing lines of the road on which the ego vehicle is running based on an image captured by the external vehicle camera, and specify the specified positions of the dividing lines as display positions of dividing line icons corresponding to the dividing lines, and
   the controller is configured to estimate the position in the left-right direction in a lane closest to the position of the second surrounding vehicle in the left-right direction, based on the specified positions of the dividing lines and the position in the front-back direction of the second surrounding vehicle.

5. The vehicle-mounted display system according to claim 1,
   further comprising an external vehicle camera capturing a road in front of the ego vehicle, wherein
   the controller is configured to calculate an angle of an advancing direction of the second surrounding vehicle of the ego vehicle with respect to an advancing direction based on an image of the second surrounding vehicle captured by the external vehicle camera, specify the position in the left-right direction of the second surrounding vehicle based on the calculated angle and the position in the front-back direction of the second surrounding vehicle measured by the surrounding vehicle position measuring device, and, when a distance between the specified position in the left-right direction of the second surrounding vehicle and the position in the left-right direction of the second surrounding vehicle measured by the surrounding vehicle position measuring device is equal to or less than the predetermined distance, make the surrounding vehicle icon corresponding to the second surrounding vehicle be displayed at a display position in the front-back direction and left-right direction corresponding the position in the front-back direction and left-right direction of the second surrounding vehicle measured by the surrounding vehicle position measuring device.

6. The vehicle-mounted display system according to claim 5, wherein the controller is configured, when the ego vehicle is changing lanes, to make the surrounding vehicle icon corresponding to the second surrounding vehicle be displayed at a display position in the front-back direction and left-right direction corresponding the positions in the front-back direction and left-right direction of the second surrounding vehicle measured by the surrounding vehicle position measuring device.

7. A vehicle-mounted display system displaying an ego vehicle and surrounding vehicles around the ego vehicle, the vehicle-mounted display system comprising:
a surrounding vehicle position measuring device detecting positions of second surrounding vehicles around the ego vehicle,
a display device displaying dividing line icons corresponding to dividing lines around the ego vehicle and surrounding vehicle icons corresponding to the surrounding vehicles around the ego vehicle, the surrounding vehicle icons having at least one of a different shape and a different color from an ego vehicle icon displayed by the display device, and
a controller controlling display of the dividing line icons and the surrounding vehicle icons at the display device, wherein
the controller is configured to, when positions of a preceding vehicle running in the same lane ahead of the ego vehicle and a further preceding vehicle running in the same lane ahead of that preceding vehicle are specified by the surrounding vehicle position measuring device, make a surrounding vehicle icon corresponding to the preceding vehicle be displayed at a display position in a front-back direction and a left-right direction corresponding to the position in the front-back direction and left-right direction of the preceding vehicle specified by the surrounding vehicle position measuring device, and make a surrounding vehicle icon corresponding to the further preceding vehicle be displayed at a display position in the front-back direction corresponding to the position in the front-back direction of the further preceding vehicle specified by the surrounding vehicle position measuring device and at a display position in the left-right direction corresponding to a center position in the left-right direction of the lane in which the further preceding vehicle is running, and the controller is configured to estimate the center position in the left-right direction of the lane in which the second surrounding vehicle is running, based on a position in the front-back direction of the second surrounding vehicle and, when a distance between the estimated center position in the left-right direction of the lane and a center position in the left-right direction of the second surrounding vehicle measured by the surrounding vehicle position measuring device is equal to or less than a predetermined distance, make the surrounding vehicle icon corresponding to the second surrounding vehicle be displayed at a display position in the front-back direction and left-right direction corresponding to the positions in the front-back direction and left-right direction of the second surrounding vehicle measured by the surrounding vehicle position measuring device.

* * * * *